(12) United States Patent
Iwashita et al.

(10) Patent No.: US 8,018,192 B2
(45) Date of Patent: Sep. 13, 2011

(54) 3D-TRAJECTORY DISPLAY DEVICE FOR MACHINE TOOL

(75) Inventors: Yasusuke Iwashita, Minamitsuru-gun (JP); Tadashi Okita, Minamitsuru-gun (JP); Junichi Tezuka, Minamitsuru-gun (JP); Kazuyuki Sugiyama, Minamitsuru-gun (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 12/822,249

(22) Filed: Jun. 24, 2010

(65) Prior Publication Data

US 2011/0057599 A1     Mar. 10, 2011

(30) Foreign Application Priority Data

Sep. 10, 2009   (JP) ................................ 2009-209415

(51) Int. Cl.
     *G05B 19/18*         (2006.01)
(52) U.S. Cl. ......... 318/569; 318/560; 318/570; 318/574
(58) Field of Classification Search ................... 318/560, 318/565, 568.17, 568.25, 569, 600, 570, 318/574; 483/2, 7, 10, 16, 17; 702/94, 95
See application file for complete search history.

(56) References Cited

U.S. PATENT DOCUMENTS

| | | | | |
|---|---|---|---|---|
| 4,881,021 A | * | 11/1989 | Hirai | 318/569 |
| 5,117,169 A | * | 5/1992 | Kakino et al. | 318/578 |
| 6,097,168 A | * | 8/2000 | Katoh et al. | 318/568.11 |
| 6,744,233 B1 | * | 6/2004 | Tsutsui | 318/560 |
| 7,450,127 B2 | * | 11/2008 | Hong et al. | 345/474 |
| 7,792,604 B2 | * | 9/2010 | Hong et al. | 700/188 |

FOREIGN PATENT DOCUMENTS

| | | |
|---|---|---|
| JP | 05-073121 | 3/1993 |
| JP | 07-072916 | 3/1995 |
| JP | 11-143514 | 5/1999 |
| JP | 2007-023742 | 2/2007 |
| JP | 2008-188694 | 8/2008 |

OTHER PUBLICATIONS

Japanese Notice of Reasons for Rejection mailed Oct. 12, 2010 issued in Japanese Application No. 2009-209415 (including a Verified English-language translation thereof).
Japanese Notice of Reasons for Rejection mailed Oct. 12, 2010 issued in Japanese Application No. 2009-209415 (including a partial translation thereof).

* cited by examiner

*Primary Examiner* — Bentsu Ro
*Assistant Examiner* — Antony M Paul
(74) *Attorney, Agent, or Firm* — Drinker Biddle & Reath LLP

(57) ABSTRACT

A trajectory display device capable of correctly quantifying an error of a three-dimensional trajectory of a machine tool, and displaying or outputting the error. The trajectory display device has a command line segment defining part adapted to define a command line segment which connects two temporally adjacent points, in relation to each commanded position; an error calculating part adapted to define a normal line extending from the actual position to each command line segment and calculate an error of the actual position relative to a commanded trajectory, the error being determined as a shorter one between a length of a shortest normal line among the defined normal lines and a length of a line segment extending from the actual position to a commanded position which is the nearest from the actual position.

5 Claims, 5 Drawing Sheets

3D-TRAJECTORY DISPLAY DEVICE FOR MACHINE TOOL

RELATED APPLICATIONS

The present application claims priority from Japanese Patent Application No. 2009-209415, filed on Sep. 10, 2009, the entire contents of which are fully incorporated herein by reference.

BACKGROUND OF THE INVENTION

1. Field of the Invention

The present invention relates to a display device which displays a three-dimensional trajectory of a machine tool.

2. Description of the Related Art

Generally, the trajectory of a representative point, such as a front end of a tool of a machine tool, represents a three-dimensional curve. Since it is not easy to calculate an error of the three-dimensional curve, i.e., the difference between a commanded trajectory and actual trajectory (or a feedback trajectory), it is difficult to intuitively know the amount of error.

In order to easily grasp the amount of error, for example, Japanese Unexamined Patent Publication (Kokai) No. 11-143514 discloses a device adapted to display a trajectory of each axis of a machine tool, wherein a positional deviation of each axis is combined, and the trajectory is indicated while a line-type or a line color is varied depending on whether or not the combined positional error exceeds a predetermined limit value.

The combined positional deviation as described above represents a delay in the actual position relative to the commanded position at a given time. In other words, the positional deviation does not represent the deviation of the actual position from a commanded trajectory. Therefore, the combined value of the positional deviation does not correctly indicate the deviation of the actual position from the commanded trajectory. Thus, it is difficult to correctly know the error of the actual three-dimensional trajectory, and it takes time to specify a problem on the trajectory and found a cause thereof.

SUMMARY OF THE INVENTION

An object of the present invention is to provide a trajectory display device capable of correctly quantifying an error of a three-dimensional trajectory of a machine tool, and displaying or outputting the error.

According to one aspect of the present invention, there is provided a trajectory display device adapted to display a three-dimensional trajectory of an actual position of an object, the three-dimensional position of the object being controlled by a numerical controller, the trajectory display device comprising: a commanded position data obtaining part adapted to obtain data of a commanded position of the object at discrete time intervals; an actual position data obtaining part adapted to obtain data of an actual position of the object at discrete time intervals; a command line segment defining part adapted to define a command line segment which connects two temporally adjacent points, in relation to each point corresponding to the commanded position; an error calculating part adapted to calculate an error of the actual position relative to a commanded trajectory, the error being determined as a shorter one between (i) a length of a shortest normal line among normal lines each extending from the actual position to the command line segment at each discrete time and (ii) a length of a line segment extending from the actual position to a commanded position which is the nearest from the actual position; and at least one of an error displaying part adapted to display the error and an outputting part adapted to output the error to the outside.

In a preferred embodiment, the error calculating part calculates the error of each actual position of the object, only in relation to a command line segment including the commanded position, a time lag of which relative to each actual position is within a predetermined period of time.

In a preferred embodiment, the error displaying part displays the three-dimensional trajectory of the actual position of the object, while magnifying the error by a predetermined ratio in the error direction relative to the commanded trajectory, the error of which is to be calculated.

In a preferred embodiment, the error displaying part changes at least one of color and a line thickness of the trajectory, corresponding to the magnitude of the error.

According to another aspect of the invention, there is provided a machine tool comprising the trajectory display device of the invention and a numerical controller to control a plurality of drive axes including a rotational axis, the machine tool being adapted to control the position of a tool relative to an object to be machined, wherein the trajectory display device calculates the three-dimensional coordinate of a front end of the tool based on information of a command and an actual position of each drive axis, determines a commanded position and an actual position of the front end of the tool, calculates an error of the actual position relative to the commanded position, and displays or outputs the error.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
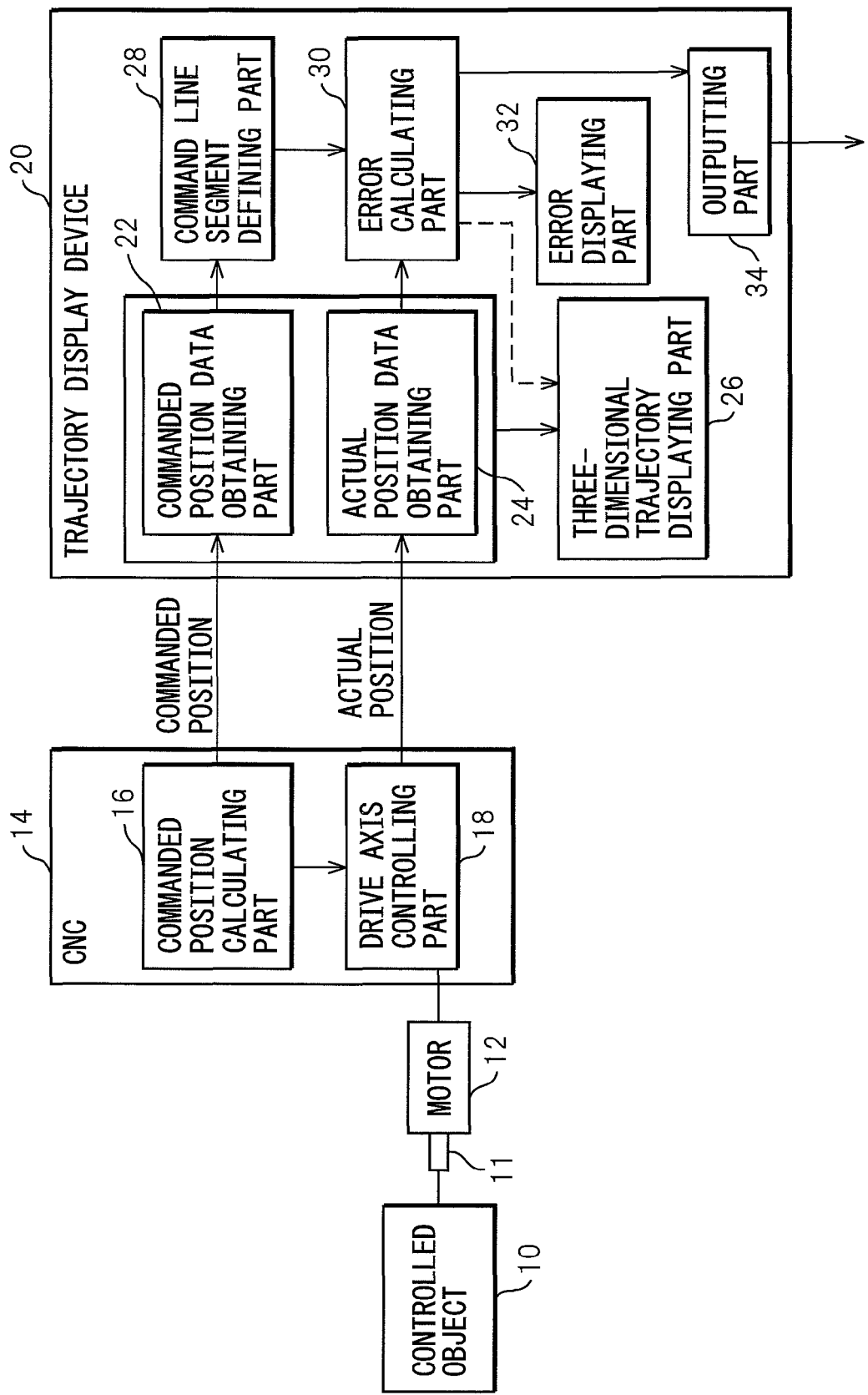
FIG. 1 shows a schematic configuration of a system including a trajectory display device according to an embodiment of the present invention.

FIG. 1 shows one example of a system configuration including a trajectory display device according to the present invention. An object 10 to be controlled, such as a tool of a machine tool, is driven by a motor 12, such as a servomotor, via a drive axis 11, and motor 12 is controlled by a numerical controller (CNC) 14. CNC 14 has a commanded position calculating part 16 adapted to calculate a commanded position where object 10 should be positioned at each time, and a drive axis controlling part 18 adapted to control the motion of motor 12 based on the commanded position calculated by commanded position calculating part 16.

A trajectory display device 20 of the invention is adapted to display a three-dimensional trajectory of an actual position of object 10, and has a commanded position data obtaining part 22 adapted to obtain data of the commanded position of the object at discrete time intervals from commanded position calculating part 16 of CNC 14; an actual position data obtaining part 24 adapted to obtain data of the actual position of the object at discrete time intervals from drive axis controlling part 18; and a three-dimensional displaying part 26, such as a monitor. Three-dimensional displaying part 26 may display at least one of a three-dimensional commanded position trajectory of object 10 based on the above commanded position data and a three-dimensional actual position trajectory of object 10 based on the above actual position data. In addition, the commanded position trajectory means a trajectory formed by line segments in which each connects two temporally adjacent commanded positions, and the actual position trajectory means a trajectory formed by line segments in which each connects two temporally adjacent actual positions.

Trajectory display device 20 has a command line segment defining part 28 adapted to define a command line segment which connects two temporally adjacent points, in relation to each corresponding to the commanded position obtained by commanded position data obtaining part 22; and an error calculating part 30 adapted to calculate an error of the actual position relative to the commanded trajectory, the error being determined as a shorter one between (i) the minimum length of a normal line among normal lines each extending from the actual position, obtained by actual position data obtaining part 24, to the command line segment at each discrete time and (ii) the length of a line segment extending from the actual position to a commanded position which is the nearest from the actual position. Trajectory display device 20 further has at least one of an error displaying part 32, such as a monitor, adapted to display the error and an outputting part 34 adapted to output the error to external equipment, such as another display device. In addition, trajectory displaying part 26 as described above may function also as error displaying part 32.

Figure 2:
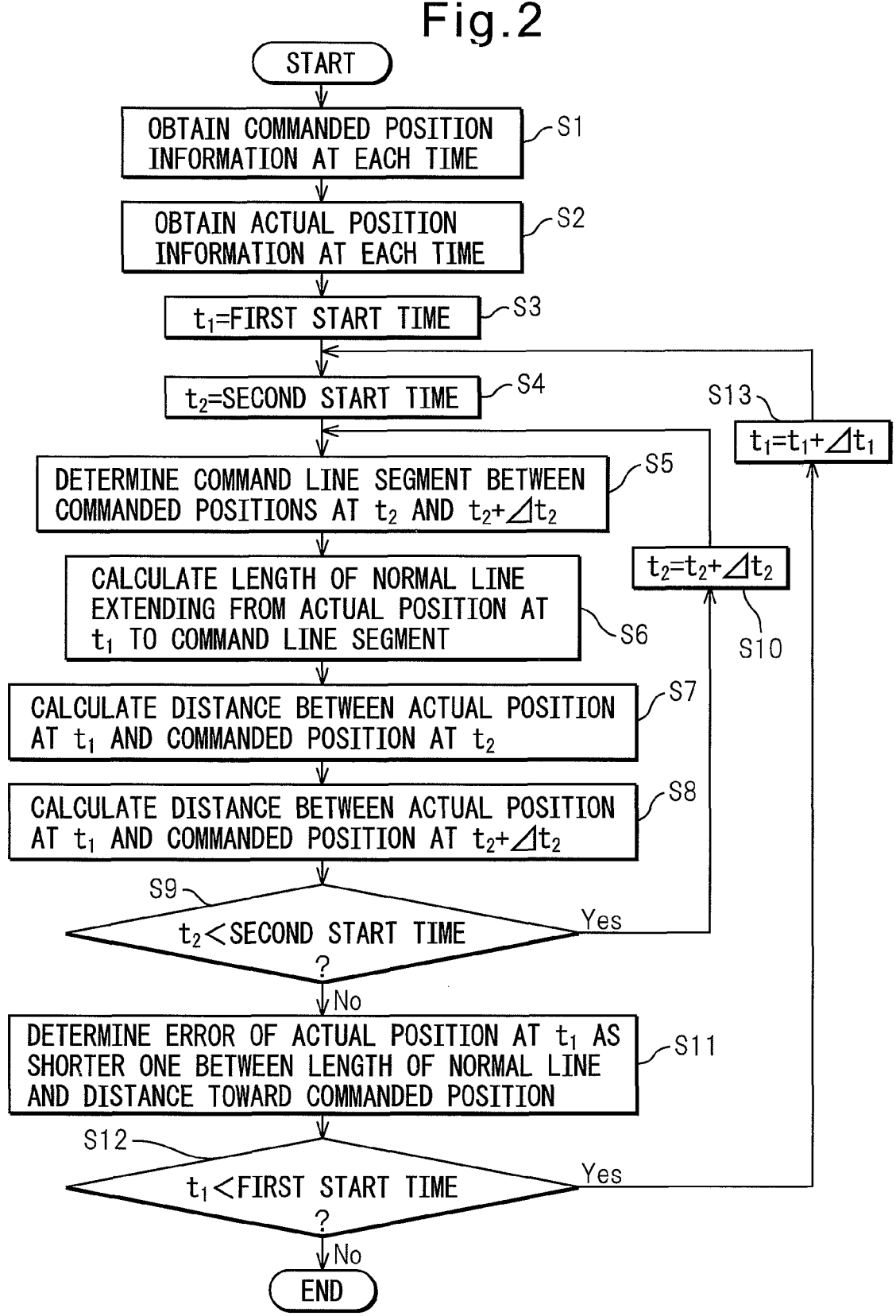
FIG. 2 shows an example of a flowchart for calculating an error of an actual position of an object to be controlled.
Figure 3:
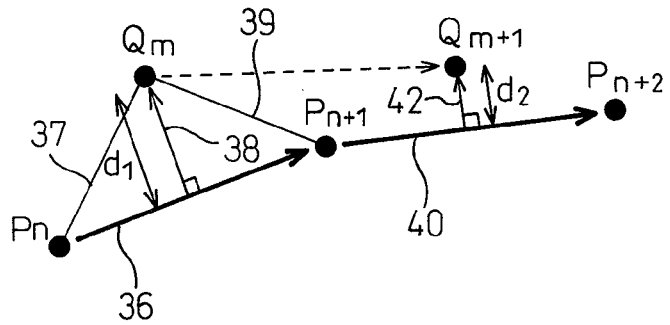
FIG. 3 shows a display example of the commanded position and the actual position of the object.

FIG. 2 is a flowchart showing a procedure for calculating an error of each actual position of the object in the trajectory display device of the invention. First, in step S1, information of the three-dimensional commanded position at each time, which is specified at suitable time intervals, is obtained. Due to this, as shown in FIG. 3, temporally ordered commanded positions $P_n$, $P_{n+1}$, $P_{n+2}$, ..., where a representative point of the object to be controlled should pass through, are obtained.

Next, in step S2, information of the three-dimensional actual position at each time is obtained. Concretely, the actual position may be obtained by a position feedback. Due to this, as shown in FIG. 3, time series data or actual positions $Q_m$, $Q_{m+1}$, $Q_{m+2}$, ..., where the representative point of the object to be controlled actually passes through, are obtained.

In the next step S3, a time $t_1$ of one actual position, which is temporally primary among the actual positions, the error of which are to be calculated, is set as a first start time. Then, in the next step S4, a time $t_2$ of one commanded position, which is temporally primary among the commanded positions included in the commanded trajectory, relative to which the error of the actual position is to be calculated, is set as a second start time.

In the next step S5, a line segment, connecting the commanded position at time t2 and the commanded position at time $t_2+\Delta t_2$, is set as a command line segment. In the example of FIG. 3, the commanded position at time $t_2$ is set as position $P_n$, and the commanded position at time $t_2+\Delta t_2$ is set as position $P_{n+1}$. Then, a command line segment connecting the two commanded positions is set as a line segment 36.

Next, in step S6, it is judged whether a normal line can extend from the actual position at time $t_1$ to one of the set commanded line segment. If yes, the length of the normal line is calculated. In the example of FIG. 3, a normal line 38 can extend from actual position $Q_m$ to line segment 36, and thus a length $d_1$ of normal line 38 is calculated. Then, length $d_1$ is stored in a suitable memory, as a candidate of an error of actual position $Q_m$.

Next, in step S7, the length of a line segment 37, connecting actual position $Q_m$ at time $t_1$ and commanded position $P_n$ at time $t_2$, is calculated. Further, in step S8, the length of a line segment 39, connecting actual position $Q_m$ and commanded position $P_{n+1}$ at time $t_2+\Delta t_2$, is calculated. The lengths of line segments 37 and 39 are stored in a suitable memory, as candidates of the error of actual position $Q_m$.

In the next step S9, it is judged whether time $t_2$ reaches a predetermined second finish time. If no, the procedure progresses to step S10, wherein $t_2+\Delta t_2$ is substituted into $t_2$. In other words, in the example of FIG. 3, the next process executed in step S5 is to determine a command line segment 40 which connects commanded positions $P_{n+1}$ and $P_{n+2}$. In addition, the second finish time is usually set to a time of the latest commanded position among the commanded positions included in the commanded trajectory, the error of which is to be calculated.

Figure 4:
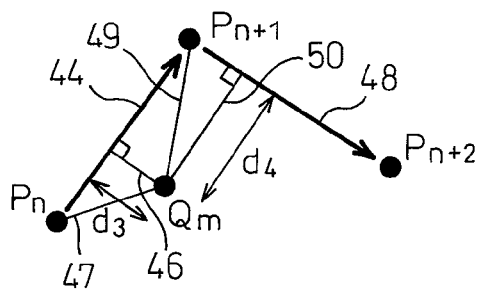
FIG. 4 shows an example wherein a plurality of normal lines may extend from one actual position to a commanded trajectory.

In step S9, when it is judged that time t2 reaches the predetermined second finish time, the procedure progresses to step S11. In step S11, the error of actual position $Q_m$ relative to the commanded trajectory is determined as a shorter one between (i) the length of the normal line extending from actual position $Q_m$ to the commanded line segment (when a plurality of normal lines exist as shown in FIG. 4 below, the length of the shortest normal line among the normal lines), and (ii) the length of the shortest line segment among the line segments (in the example of FIG. 3, line segments 37, 39) each extending from the actual position to the commanded position as determined in steps S7, S8. In the example of FIG. 3, the error of actual position $Q_m$ is determined to length $d_1$ of normal line 38, and similarly, the error of actual position $Q_{m+1}$ is determined to length $d_2$ of normal line 42.

FIG. 4 shows an example wherein a plurality of normal lines may extend from one actual position to the commanded trajectory (or the line segment). As shown in FIG. 4, depending on the position of the actual position, a plurality of normal lines may extend from one actual position to a plurality of line segments. In such a case, the length of the shortest normal line is set as a candidate of the error to be determined. In the example of FIG. 4, a length $d_3$ of a normal line 46 extending from actual position $Q_m$ to a line segment 44 is shorter than a length $d_4$ of a normal line 50 extending from actual position $Q_m$ to a line segment 48, and thus length $d_3$ is stored as the candidate of the error. On the other hand, in relation to line segments 47 and 49 extending from actual position $Q_m$ to commanded positions $P_n$ and $P_{n+1}$, respectively, line segment 47 is shorter than line segment 49. However, length $d_3$ of normal line 46 is still smaller than the length of line segment 47, and as a result, length $d_3$ is determined as the error of actual position $Q_m$.

Figure 5:
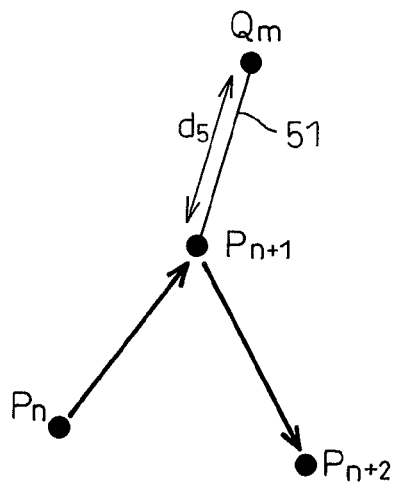
FIG. 5 shows an example wherein no normal line may extend from one actual position to a commanded trajectory.

As exemplified in FIG. 5, in some cases, no normal line can extend from actual position $Q_m$ to the commanded trajectory. In such a case, the length of a line segment, connecting actual position $Q_m$ and a commanded position which is the nearest from actual position $Q_m$, is determined as the error. In the example of FIG. 5, commanded position $P_{n+1}$ is the nearest from actual position $Q_m$, and thus a length $d_5$ of a line segment 51 extending from actual position $Q_m$ to commanded position $P_{n+1}$ is set as the error of actual position $Q_m$.

In step S12, it is judged whether time $t_1$ reaches a predetermined first finish time. If no, the procedure progresses to step S13, wherein $t_1+\Delta t_1$ is substituted into $t_1$. In other words, in the example of FIG. 3, the next process executed in step S4 and the subsequent steps is to determine an error of actual position $Q_{m+1}$ relative to the commanded trajectory. Therefore, the first finish time is usually set to a time of the latest actual position among the actual positions, the errors of which are to be calculated.

Figure 6:
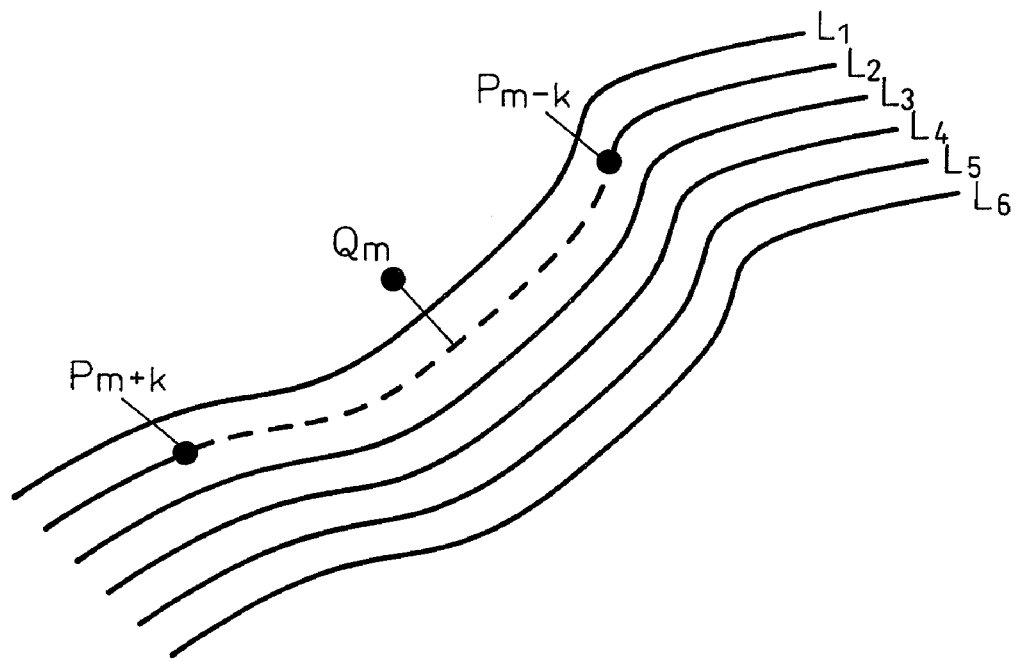
FIG. 6 shows an example wherein a time range of the commanded position is limited when the error of the actual position is calculated.

FIG. 6 shows an example wherein a time range based on the time of each actual position is limited, when the error of the actual position is calculated, so as to reduce the load of the process. As shown in FIG. 6, when a plurality of commanded trajectories $L_1$ to $L_6$ are positioned close to each other, the distance between actual position $Q_m$ and a trajectory other than a trajectory (in this case, trajectory $L_2$), where the error of actual position $Q_m$ is to be calculated, may be calculated. In order to avoid this, it is effective to calculate the error between actual position $Q_m$ and a command line segment including a commanded position the time of which is close to the time of actual position $Q_m$. Concretely, a commanded position, a time lag of which relative to the time of actual position $Q_m$ is within a predetermined value, is extracted (in this case, positions $P_{m-k}$ to $P_{m+k}$ are extracted), and only a line segment including the extracted position (indicated by a dotted line in FIG. 6) is used in calculating the error of actual position $Q_m$. Due to this, trajectory other than $L_2$, the time of which is considerably different from the time of actual position $Q_m$ is not used in calculating the error, whereby the load of the process may be reduced.

Figure 7:
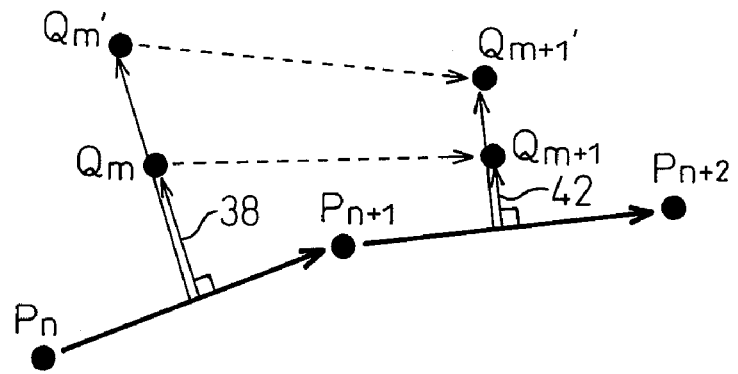
FIG. 7 shows a procedure for displaying an enlarged view of the error.

In the present invention, a section, including a large error of the actual position, may be configured to be visually easily observed. Concretely, as shown in FIG. 7, a normal line between each actual position and the commanded trajectory is extended at a predetermined magnification, in the direction of the normal opposite to the commanded trajectory (in other words, the direction of the extended normal line is not changed), and one end of each extended normal line, not positioned on the commanded trajectory, is connected each other with a line, as a trajectory of the actual positions. In the example of FIG. 7, normal line 38 indicating the error of actual position $Q_m$ is extended at two-fold magnification so as to obtain actual position $Q_m{}'$, and normal line 42 indicating the error of actual position $Q_{m+1}$ is extended at two-fold magnification so as to obtain actual position $Q_{m+1}{}'$. Due to this, when an actual position trajectory 52 based on actual position $Q_m$ and $Q_{m+1}$ does not match a commanded trajectory 54, as exemplified in a part "A" of FIG. 8a, the error of the actual position is exaggerated in an actual position trajectory 56 based on actual position $Q_m{}'$ and $Q_{m+1}{}'$, as shown in a part "B" of FIG. 8b. Therefore, the operator can easily find the actual position having a large error. In addition, when no normal line exits as shown in FIG. 5, similarly to the case of FIG. 7, the line segment connecting the actual position and the nearest commanded position may be extended at a predetermined magnification, toward the actual position side.

Figure 8A:
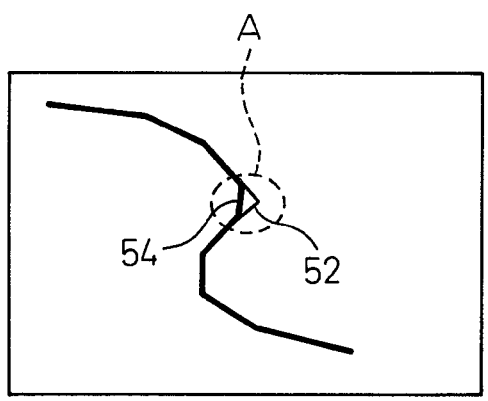
FIG. 8*a* shows a display example before the error of the actual position is enlarged.
Figure 8B:
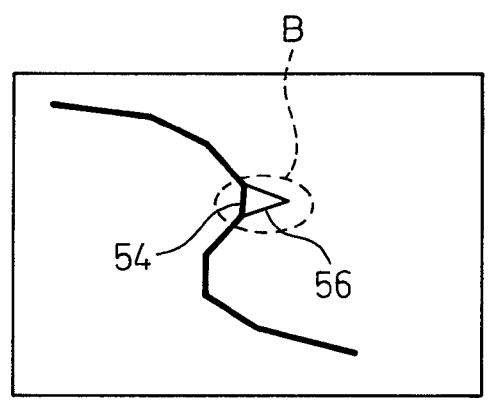
FIG. 8*b* shows a display example after the error of the actual position is enlarged.
Figure 9:
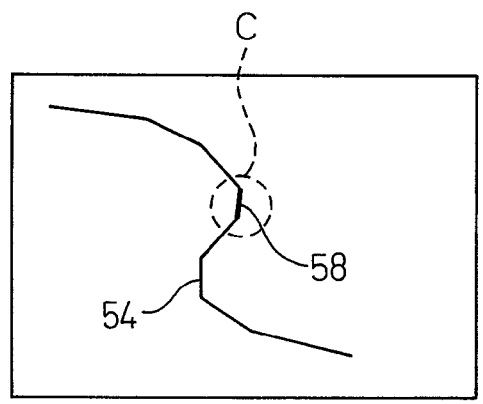
FIG. 9 shows an example wherein a part having a relatively large error is indicated by changing a line thickness of the commanded trajectory.

As another means for exaggerating the error of the actual position, as exemplified in FIG. 9, the thickness of a part of the commanded trajectory, which corresponds to the actual position (the actual position trajectory) having a large error, may be changed, without indicating the actual position or the actual position trajectory. For example, as shown in a part "C" of FIG. 9 the actual position or the actual position trajectory as shown in FIG. 8a or 8b is not indicated, and a part 58 of commanded trajectory 54 is indicated so that the thickness of the part is larger than the other part of the commanded trajectory. Due to this, the operator can easily find the actual position having a large error. In addition, additionally or alternatively, color of the part of the commanded trajectory corresponding to the actual position having the large error may be different from the other part of the commanded trajectory. Otherwise, the actual position trajectory may be indicated as shown in FIG. 8a or 8b, and the thickness and/or the color of the actual position trajectory may be changed.

The trajectory display device of the invention may be particularly advantageous, when the trajectory of the controlled object is a complicated three-dimensional trajectory, for example when the above numerical controller controls a plurality of drive axes including a rotation axis of a machine tool so as to control the position of a tool relative to a workpiece to be machined. In such a case, the trajectory display device may calculate the three-dimensional position of a front end of the tool based on a command for each drive axis and information of the actual position, determine the commanded position of the front end of the tool and the trajectory of the corresponding actual position, and display or output the error of the actual position (or the actual position trajectory) relative to the commanded position as calculated above.

According to the present invention, the error of the three-dimensional actual position or the actual position trajectory of the controlled object may be precisely determined. Further, by displaying the determined error or outputting the error to the other equipment, the error may be visually recognized. Therefore, a time for finding trouble in the trajectory or investigating the cause of the error may be reduced.

By limiting a time range of the commanded position for calculating the error of the actual position so that only the commanded position, a time lag of which relative to the time of actual position is within a predetermined value, the commanded trajectory which should not be compared to the actual position may be eliminated and the load of calculation may be reduced.

By changing the thickness or the color of the trajectory depending on the magnitude of the error, and/or extending the error at a predetermined magnification, the error may further easily be recognized.

By applying the trajectory display device of the invention to a machine tool, the error of the tool front end, which is moved along the complicated three-dimensional trajectory, may be precisely calculated by using a simple process.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A trajectory display device adapted to display a three-dimensional trajectory of an actual position of an object, the three-dimensional position of the object being controlled by a numerical controller, the trajectory display device comprising:

a commanded position data obtaining part adapted to obtain data of a commanded position of the object at discrete time intervals;

an actual position data obtaining part adapted to obtain data of an actual position of the object at discrete time intervals;

a command line segment defining part adapted to define a command line segment which connects two temporally adjacent points, in relation to each point corresponding to the commanded position at discrete time intervals;

an error calculating part adapted to calculate an error of the actual position relative to a commanded trajectory, the error being determined as a shorter one between (i) a length of a shortest normal line among normal lines each extending from the actual position at discrete time intervals to the command line segment at each discrete time and (ii) a length of a line segment extending from the actual position at discrete time intervals to a commanded position which is the nearest from the actual position; and at least one of an error displaying part adapted to display the error and an outputting part adapted to output the error to the outside.

2. The trajectory display device as set forth in claim 1, wherein the error calculating part calculates the error of each actual position of the object, only in relation to a command line segment including the commanded position, a time lag of which relative to each actual position is within a predetermined period of time.

3. The trajectory display device as set forth in claim 1, wherein the error displaying part displays the three-dimensional trajectory of the actual position of the object, while magnifying the error by a predetermined ratio in the error direction relative to the commanded trajectory, the error of which is to be calculated.

4. The trajectory display device as set forth in claim 1, wherein the error displaying part changes at least one of color and a line thickness of the trajectory, corresponding to the magnitude of the error.

5. A machine tool comprising the trajectory display device as set forth in claim 1 and a numerical controller to control a plurality of drive axes including a rotational axis, the machine tool being adapted to control the position of a tool relative to an object to be machined, wherein the trajectory display device calculates the three-dimensional coordinate of a front end of the tool based on information of a command and an actual position of each drive axis, determines a commanded position and an actual position of the front end of the tool, calculates an error of the actual position relative to the commanded position, and displays or outputs the error.

* * * * *